US 8,802,301 B2

United States Patent
Halalay et al.

(10) Patent No.: US 8,802,301 B2
(45) Date of Patent: Aug. 12, 2014

(54) LITHIUM ION BATTERY ELECTROLYTE INCLUDING A VITREOUS EUTECTIC MIXTURE

(75) Inventors: Ion C. Halalay, Grosse Pointe Park, MI (US); Damon R. Frisch, Troy, MI (US); Olt E. Geiculescu, Easley, SC (US); Darryl D Desmarteau, Seneca, SC (US); Stephen E Creager, Clemson, SC (US); Changqing Lu, Clemson, SC (US)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 12/902,120

(22) Filed: Oct. 11, 2010

(65) Prior Publication Data

US 2011/0111308 A1 May 12, 2011

Related U.S. Application Data

(60) Provisional application No. 61/258,972, filed on Nov. 6, 2009.

(51) Int. Cl.
*H01M 10/0568* (2010.01)
*H01M 10/0569* (2010.01)

(52) U.S. Cl.
USPC ............ 429/340; 429/188; 429/307; 429/322

(58) Field of Classification Search
None
See application file for complete search history.

(56) References Cited

U.S. PATENT DOCUMENTS

| | | | |
|---|---|---|---|
| 6,063,522 A | 5/2000 | Hamrock et al. | |
| 6,174,627 B1 | 1/2001 | Ohta et al. | |
| 6,673,496 B1 | 1/2004 | Nakagawa et al. | |
| 7,309,548 B2 | 12/2007 | Ota et al. | |
| 2007/0281209 A1 | 12/2007 | Kishi et al. | |
| 2009/0068565 A1 | 3/2009 | Lee | |
| 2009/0181308 A1 * | 7/2009 | Chiga et al. ................ | 429/231.3 |

FOREIGN PATENT DOCUMENTS

| | | | |
|---|---|---|---|
| CN | 1876739 | 12/2006 | |
| CN | 101218706 | 7/2008 | |
| CN | 101233193 | 7/2008 | |
| JP | 2004-259697 | * 9/2004 | ............ H01M 10/40 |

* cited by examiner

*Primary Examiner* — Ula C Ruddock
*Assistant Examiner* — Tony Chuo
(74) *Attorney, Agent, or Firm* — Dierker & Associates, P.C.

(57) ABSTRACT

An electrolyte for a lithium ion battery includes a vitreous eutectic mixture represented by the formula $A_xB_y$, where A is a salt chosen from a lithium fluoroalkylsulfonimide or a lithium fluoroarylsulfonimide, B is a solvent chosen from an alkylsulfonamide or an arylsulfonamide, and x and y are the mole fractions of A and B, respectively.

14 Claims, 4 Drawing Sheets

LITHIUM ION BATTERY ELECTROLYTE INCLUDING A VITREOUS EUTECTIC MIXTURE

CROSS REFERENCE TO RELATED APPLICATIONS

This application claims the benefit of U.S. Provisional Patent Application Ser. No. 61/258,972 filed on Nov. 6, 2009.

TECHNICAL FIELD

The present disclosure relates generally to lithium ion batteries, and more particularly to an electrolyte for a lithium ion battery.

BACKGROUND

Lithium ion batteries are rechargeable batteries where lithium ions move from a cathode (positive electrode) to an anode (negative electrode) during charging of the battery, and in the opposite direction when discharging the battery. The lithium ion battery also includes an electrolyte that carries the lithium ions between the cathode and the anode when the battery passes an electric current therethrough.

SUMMARY

An electrolyte for a lithium ion battery includes a vitreous eutectic mixture represented by the formula $A_xB_y$, where A is a salt chosen from lithium fluorosulfonimides, e.g., either a lithium fluoroalkylsulfonimide or a lithium fluoroarylsulfonimide, and B is a solvent chosen from an alkylsulfonamide and an arylsulfonamide.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
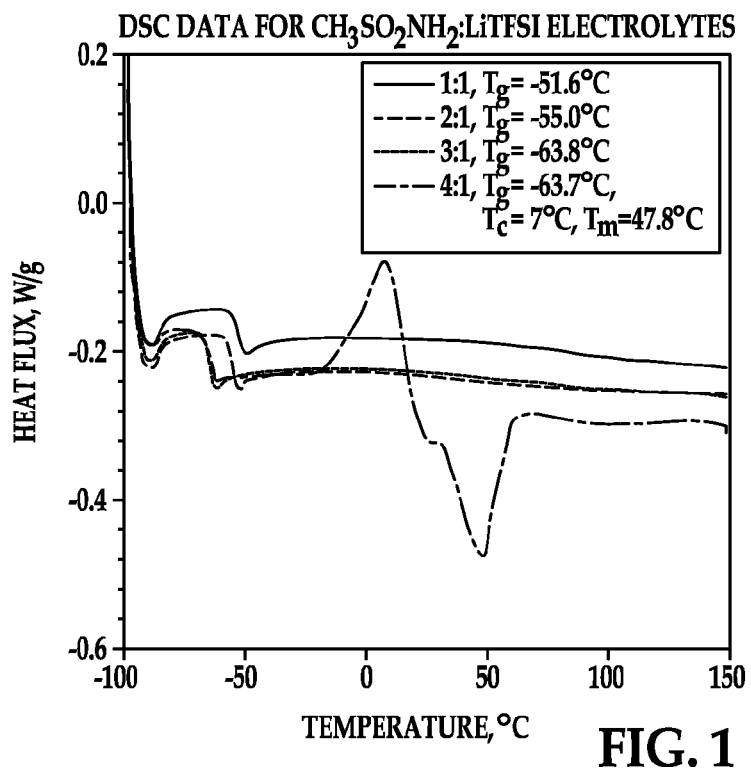
FIG. 1 is a graph depicting differential scanning calorimetry thermograms for eutectic mixtures including various ratios of methanesulfonamide and lithium bis(trifluoromethylsulfonyl)imide.

Electrolytes for lithium ion batteries have included solutions of lithium hexafluorophosphate ($LiPF_6$) salt in binary, ternary, and quaternary mixtures of organic solvents such as, e.g., cyclic and linear carbonates. Such $LiPF_6$ salt solutions in organic solvents tend to exhibit several desirable properties that render such solutions desirable for lithium ion batteries. Such properties include, for example, suitable ionic conductivity at ambient and sub-ambient temperatures and desirable passivation of an aluminum current collector at the cathode of the battery.

There are, however, several disadvantages for using $LiPF_6$ salt in lithium ion batteries. For instance, the $LiPF_6$ salt hydrolyzes with the generation of hydrofluoric acid. Furthermore, the $LiPF_6$ solutions used in lithium ion batteries typically have water levels ranging from about 10 ppm to about 100 ppm. However, such low water levels are sometimes difficult to maintain over the useful life of the battery. Other disadvantages include thermal instability, for example, with significant decomposition of the $LiPF_6$ occurring above ambient temperature (e.g., above 40° C.) and decomposition of carbonate-based organic solvents at the anode of the battery during use thereof with the generation of a gas mixture containing, e.g., carbon monoxide, carbon dioxide, hydrogen and various hydrocarbons. Additionally, the linear carbonates have low flash points and relatively high vapor pressures (e.g., about one million times that of the ionic liquid), and the use of such electrolytes in the battery may lead to undesirable consequences.

It has been found that ionic liquids (i.e., room temperature ionic liquids, as opposed to conventional molten salts) tend to be significantly more thermally stable than the $LiPF_6$ salt described above, and such ionic liquids also tend to have very low vapor pressures (e.g., on the order of nanoTorr). However, lithium ion batteries having an electrolyte including such ionic liquids tend to be adversely affected in their performance. For instance, these ionic liquids typically i) have a small lithium ion transference number (i.e., the fraction of ionic current carried by lithium cations) (e.g., <0.3), and ii) contain relatively large cations that impede the transfer of lithium ions from the ionic solution to the electrodes due to the accumulation of the cations at the electrolyte-electrode interface.

The inventors of the present disclosure, however, have unexpectedly and fortuitously discovered that ionic liquids formed using a binary vitreous eutectic mixture of i) a salt chosen from lithium fluorosulfonimides, such as a lithium fluoroalkylsulfonimide or a lithium fluoroarylsulfonimide, and ii) a solvent chosen from an alkylsulfonamide or an arylsulfonamide may be used as an effective electrolyte for lithium ion batteries. Such binary eutectic mixture(s) may, in an example, be represented by the formula $A_xB_y$, where A is a salt chosen from lithium fluoroalkylsulfonimide or lithium fluoroarylsulfonimide, and B is a solvent chosen from an alkylsulfonamide or an arylsulfonamide. The letters x and y are the mole fractions of elements A and B, respectively. This eutectic mixture is a liquid at ambient temperature and has a glass transition temperature ($T_g$) of less than −50° C. The electrolyte may be used in a lithium ion battery, where such electrolyte is generally non-flammable.

In an example, the lithium fluoroalkylsulfonimide or the lithium fluoroarylsulfonimide (component A) may individually be represented by formula (1):

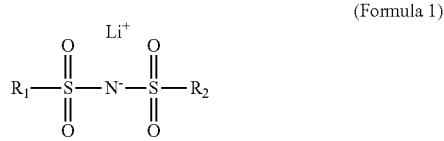
(Formula 1)

where $R_1$ and $R_2$ are individually chosen from F, $CF_3$, $C_2F_5$, $C_4F_9$, an aromatic group, or a fluorinated aromatic group. A non-limiting example of the lithium fluorosulfonimides includes lithium bis(fluorosulfonyl)imide $(LiN(FSO_2)_2)$. Some non-limiting examples of the lithium fluoroalkylsulfonimide salt include lithium bis(trifluoromethylsulfonyl)imide $(LiN(CF_3SO_2)_2)$ and lithium bis(pentafluoroethylsulfonyl)imide $(LiN(C_2F_5SO_2)_2)$, both of which are commercially available as HQ-115 and FC-130, respectively, from 3M in St. Paul, Minn. The lithium fluoroalkylsulfonimide salt may also be chosen from lithium [(trifluoromethylsulfonyl)(nonafluorobutylsulfonyl)]imide $(CF_3SO_2N(Li)SO_2C_4F_9)$, which may be synthesized according to, e.g., the scheme depicted in FIG. 7. This synthesis includes two reactants which were prepared in parallel, namely perfluorobutylsulfonyl fluoride $(C_4F_9SO_2F)$ and lithium N-trimethylsilyl-trifluoromethanesulfonamide salt $(CF_3SO_2N(Li)Si(CH_3)_3)$. First, iodoperfluorobutane $(C_4F_9I)$ was dissolved into a 1:1 (vol/vol) mixture of acetonitrile ($CH_3CN$ or "ACN") and deionized water, and then this mixture was slowly added into an aqueous solution of $Na_2S_2O_4$ and $NaHCO_3$ at a temperature of about 10° C. The mixture was added such that the molar ratio of $C_4F_9I$ to $Na_2S_2O_4$ to $NaHCO_3$ was about 1:3.2:5.5. The reaction was completed after stirring at room temperature for about two days, with the formation of a sodium sulfinate salt $(C_4F_9SO_2Na)$. Deionized water was poured in another flask, cooled down to 0° C. using an ice-salt mixture, and chlorine gas was bubbled through the solution until saturation was reached. The reaction mixture was added slowly to the flask containing the chlorine-saturated water while chlorine gas was still bubbled vigorously throughout the addition. A white precipitate was formed. This mixture was filtered and the white solid was dried in the air at room temperature for one hour. The solid was further purified by sublimation at 60° C. under dynamic vacuum, leaving a white solid perfluorobutylsulfonyl chloride $(C_4F_9SO_2Cl)$. The next step was to stir this chloride with an excess KF in dry acetonitrile at room temperature for 4 days, then the temperature was increased to 90° C. for another 2 days, at which time $^{19}F$ NMR showed the reaction to be complete. The reaction mixture was filtered through a celite layer, and the product was isolated from filtrate by the addition of excess deionized water. The product, perfluorobutylsulfonyl fluoride $(C_4F_9SO_2F)$, was dried over $P_2O_5$ and then distilled under dynamic vacuum at room temperature.

Figure 7:
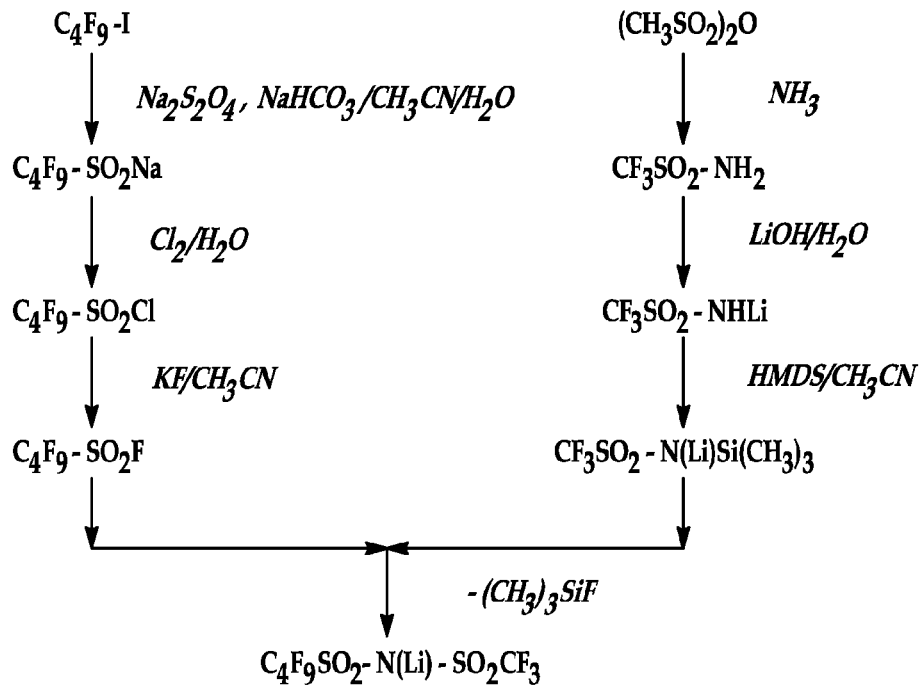
FIG. 7 depicts a chemical scheme for synthesizing lithium [(trifluoromethylsulfonyl)(nonafluorobutylsulfonyl)]imide.

The starting material for the end-capping reactant, lithium N-trimethylsilyl-trifluoromethanesulfonamide salt $(CF_3SO_2N(Li)Si(CH_3)_3)$, was the triflic anhydride $((CF_3SO_2)_2O)$. First, the trifluoromethanesulfonamide $(CF_3SO_2NH_2)$ was prepared, as shown in FIG. 7, by first condensing at −80° C. ammonia from a gas cylinder into a 250 mL flask cooled into an ethanol-based bath. Then, triflic anhydride $((CF_3SO_2)_2O)$ was added drop-wise while keeping the ammonia in excess. The mixture was stirred overnight with the temperature slowly increasing from −80° C. to room temperature. The majority of excess ammonia was evaporated by nitrogen purge. Next, the trifluoromethanesulfonamide $(CF_3SO_2NH_2)$, which was a white solid, was separated from ammonium triflate $(CF_3SO_3NH_4)$ by sublimation under vacuum at 90-100° C. The reaction yield was 88.3%. The lithium trifluoromethanesulfonamide salt $(CF_3SO_2NHLi)$ was prepared by dissolving the trifluoromethanesulfonamide in deionized water and then titrating it with a 0.1 M aqueous solution of LiOH until the pH reached the value of 8.4. Next, the water was evaporated using a rotary evaporator, and the resulting white solid $(CF_3SO_2NHLi)$ was dried overnight at 120° C. under dynamic vacuum. The lithiation reaction yield was 100%. Next, a quantity of lithium trifluoromethanesulfonamide salt $(CF_3SO_2NHLi)$ (16.1 mmoles, M=155 g/mol, 2.50 g) is loaded in a one-piece reactor, and about 10 mL of hexamethyldisilazane (HMDS) is added followed by 20 mL of dry acetonitrile. The solution is refluxed for about 24 hours, then the excess HMDS and acetonitrile are evaporated under a dynamic vacuum resulting in a white solid—the end-capping agent lithium N-trimethylsilyl-trifluoromethanesulfonamide salt $(CF_3SO_2N(Li)Si(CH_3)_3)$. This white material is dried at a temperature of about 100° C. overnight under the dynamic vacuum.

During the coupling step of the synthesis depicted in FIG. 7, an excess amount of perfluorobutylsulfonyl fluoride $(C_4F_9SO_2F)$ (33.1 mmole, M=302 g/mol, 10.0 g) previously obtained is vacuum transferred to the reactor containing $CF_3SO_2N(Li)Si(CH_3)_3$, and 50 mL of dry ACN was added to it. The mixture was then heated at 100° C. for 4 days inside the reactor. The solvent and excess perfluorobutylsulfonyl fluoride are evaporated under a dynamic vacuum to form a final, slightly yellowish solid product $(C_4F_9SO_2N(Li)SO_2CF_3$ (14.8 mmoles, M=437 g/mol, 6.50 g). The reaction yield is about 92.0%.

Figure 8:
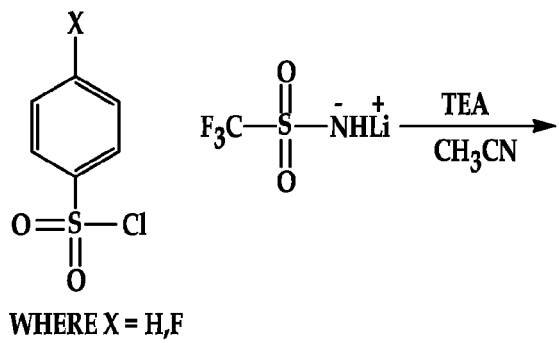
FIG. 8 depicts a chemical scheme for synthesizing lithium [(trifluoromethylsulfonyl)(phenylsulfonyl)]imide.
Figure 8:
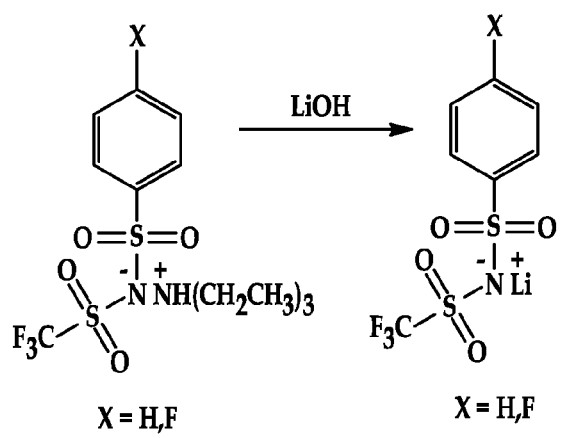

A non-limiting example of the lithium fluoroarylsulfonimide salt includes lithium [(trifluoromethylsulfonyl)(fluorophenylsulfonyl)]imide $(CF_3SO_2N(Li)SO_2C_6X_5$, where X is chosen from H and F). The lithium [(trifluoromethylsulfonyl)(phenylsulfonyl)]imide salt $(CF_3SO_2N(Li)SO_2C_6H_5)$ may be synthesized according to, e.g., the scheme depicted in FIG. 8. This synthesis involves dissolving benzenesulfonyl chloride $(C_6H_5SO_2Cl)$ (20.0 mmoles, M=176.5 g/mol, 3.53 g) into 50 mL of dry acetonitrile ($CH_3CN$ or ACN), and adding the solution to a 250 mL flask containing a solution of lithium trifluoromethanesulfonamide salt $(CF_3SO_2NHLi)$ (20.0 mmoles, M=155 g/mol, 3.10 g) dissolved into 50 mL of dry ACN. The addition of the solution to the flask is accomplished under a nitrogen flow. Then, excess triethylamine $(N(C_2H_5)_3)$ (61.3 mmole, M=101 g/mol, 6.19 g, 8.50 mL), previously dried over calcium hydride and distilled over $P_4O_{10}$ overnight, is added drop-wise to the flask, and the resulting mixture is heated to a temperature ranging from about 70° C. to about 80° C. for about 16 hours. A precipitated white LiCl may be removed by filtration, and the solution is concentrated by evaporating the solvents under a dynamic vacuum to obtain a viscous orange oil. Next, deionized water is added, and the suspension stirred while another aqueous solution of LiOH (30.0 mmole, M=24 g/mol, 0.72 g) is added. Stirring may be accomplished at room temperature (e.g., about 25° C. for about 1 hour). The water is removed by, e.g., rotary evaporation and then the mixture is vacuum dried overnight at a temperature of about 60° C. The final product $CF_3SO_2N(Li)SO_2C_6H_5$ (LiPhTFSI) is extracted with dry ACN and may be filtered off to separate the product from the inorganic compounds. The solvent may subsequently be removed by vacuum drying overnight at 60° C., producing a dark orange solid (18.0 mmole, M=295 g/mol, 5.31 g). The final yield is about 90%.

The alkylsulfonamide and the arylsulfonamide (component B) may individually be represented by formula (2):

(Formula 2)

where $R_3$ is chosen from $CH_3$, $C_2H_5$, $C_4H_9$, aryl, fluorinated aryl, $(CH_2)_nCF_3$ (where n is 1 to 5), or $(CH_2)_nOR_6$ (where n is 1 or 2 and $R_6$ is $CH_3$ or $CF_3$, and $R_4$ and $R_5$ are chosen from H, $CH_3$, or $C_4H_9$. A non-limiting example of the alkylsulfonamide includes methanesulfonamide ($CH_3SO_2NH_2$) (which is commercially available from Alfa Aesar GmbH, Ward Hill, Mass.). Another non-limiting example of the alkylsulfonamide includes N,N-dimethylmethanesulfonamide ($CH_3SO_2N(CH_3)_2$) (which is commercially available from AlfaAesar GmbH, Ward Hill, Mass.). Yet another non-limiting example of the alkylsulfonamide includes N-methylmethanesulfonamide ($CH_3SO_2NHCH_3$) (which is commercially available from AK Scientific, Inc., Palo Alto, Calif.). Still other examples of the alkylsulfonamide include ethanesulfonamide ($C_2H_5SO_2NH_2$), n-butanesulfonamide (n-$C_4H_9SO_2NH_2$) and alkylethersulfonamides (all of which may be obtained from the corresponding commercially available sulfonylchlorides through a chemical reaction with ammonia). Some non-limiting examples of the arylsulfonamide include benzenesulfonamide ($C_6H_5SO_2NH_2$) and fluorinated benzenesulfonamide ($C_6H_xF_{5-x}SO_2NH_2$). Such materials may also be commercially available from Alfa Aesar GmbH.

FIG. 1 provides differential scanning calorimetry thermograms for binary mixtures containing methanesulfonamide and lithium bis(trifluoromethylsulfonyl)imide (LiTFSI). LiTFSI has a melting temperature of about 234° C., and methanesulfonamide has a melting temperature of about 91° C. However, as shown in FIG. 1, their eutectic mixtures having molar ratios ranging from 1:1 to 1:3 do not exhibit any melting endotherms or crystallizing exotherms. Since these mixtures do not crystallize at any temperature, it is to be understood that the use of the term "eutectic" is used herein in an extended sense with respect to its traditional metallurgical meaning, to include vitreous or glassy materials. In some instances, the eutectic mixtures having molar ratios ranging from 1:0.2 to 1:10 also exhibit similar behavior (though not shown in FIG. 1). In such ratios, the eutectic mixtures are liquids at ambient temperature, and have a glass transition temperature $T_g$ of less than about −50° C.

Figure 2:
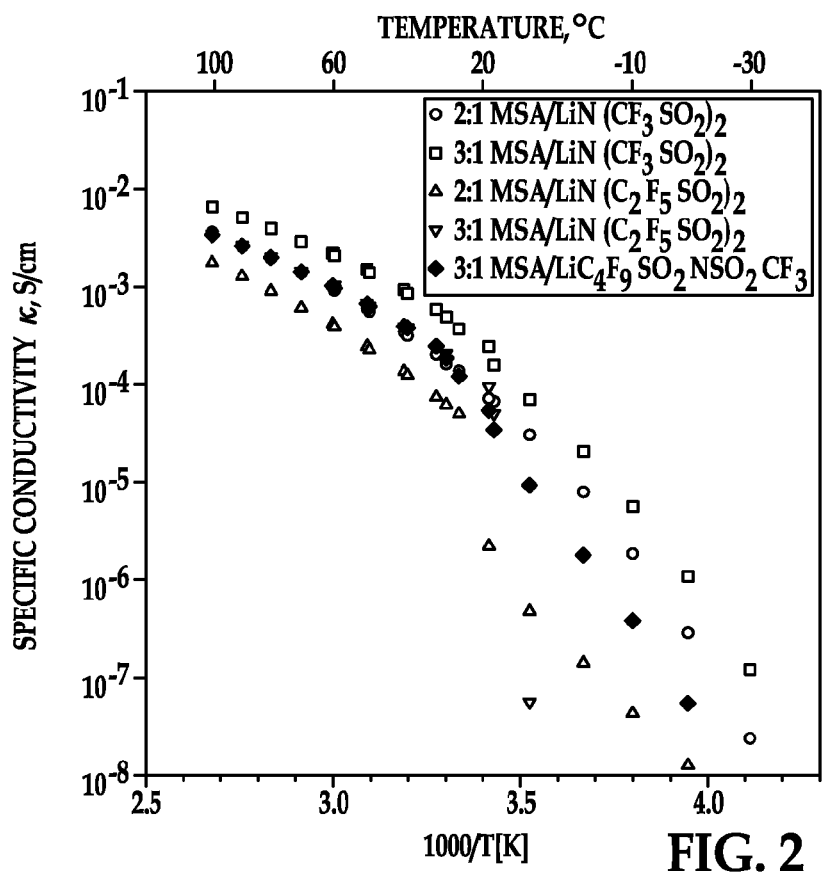
FIG. 2 is a graph depicting the temperature dependence of the specific conductivity for various examples of methanesulfonamide-based eutectic electrolytes as disclosed herein.

The temperature dependence of the specific conductivity (κ) for methanesulfonamide (MSA)-based eutectic ionic liquids is shown in FIG. 2. As shown in FIG. 2, the highest conductivity may be obtained for the methanesulfonamide/LiTFSI eutectic mixture having a 3:1 ratio. This conductivity value reaches about $3 \times 10^{-4}$ S/cm at room temperature, generally from about 20° C. (68° F.) to about 25° C. (77° F.). In an example, the eutectic mixture has a specific conductivity ranging from about $3.5 \times 10^{-4}$ S/cm to about $1 \times 10^{-7}$ S/cm over a temperature range of about +25° C. to about −30° C. In a further example, the eutectic mixture has a specific conductivity ranging from about $10^{-2}$ S/cm to about $10^{-4}$ S/cm over a temperature range from about +25° C. to about −30° C. In yet another example, the eutectic mixture has a specific conductivity ranging from about $4 \times 10^{-2}$ S/cm to about $1 \times 10^{-4}$ S/cm over a temperature range from about +25° C. to about −30° C.

Figure 3:
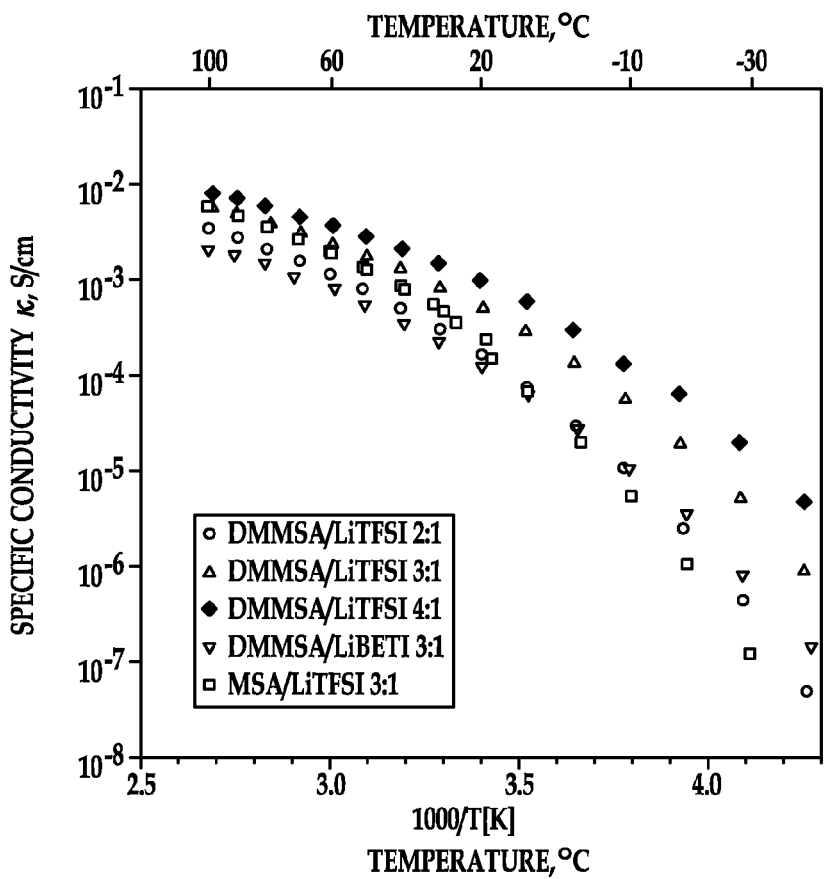
FIG. 3 is a graph depicting the temperature dependence of the specific conductivity for various examples of N,N-dimethylmethanesulfonamide-based eutectic lithium electrolytes as disclosed herein.

The temperature dependence of the specific conductivity (κ) for N,N-dimethylmethanesulfonamide (DMMSA)-based eutectic ionic liquids is shown in FIG. 3. As shown in FIG. 3, the highest conductivity may be obtained for the N,N-dimethylmethanesulfonamide/LiTFSI eutectic mixture having a 4:1 ratio. This conductivity value reaches about $1 \times 10^{-3}$ S/cm at room temperature, again which is generally from about 20° C. (68° F.) to about 25° C. (77° F.). In an example, the eutectic mixture has a specific conductivity ranging from about $1.5 \times 10^{-3}$ S/cm to about $2 \times 10^{-5}$ S/cm over a temperature range of about +25° C. to about −30° C.

Figure 4:
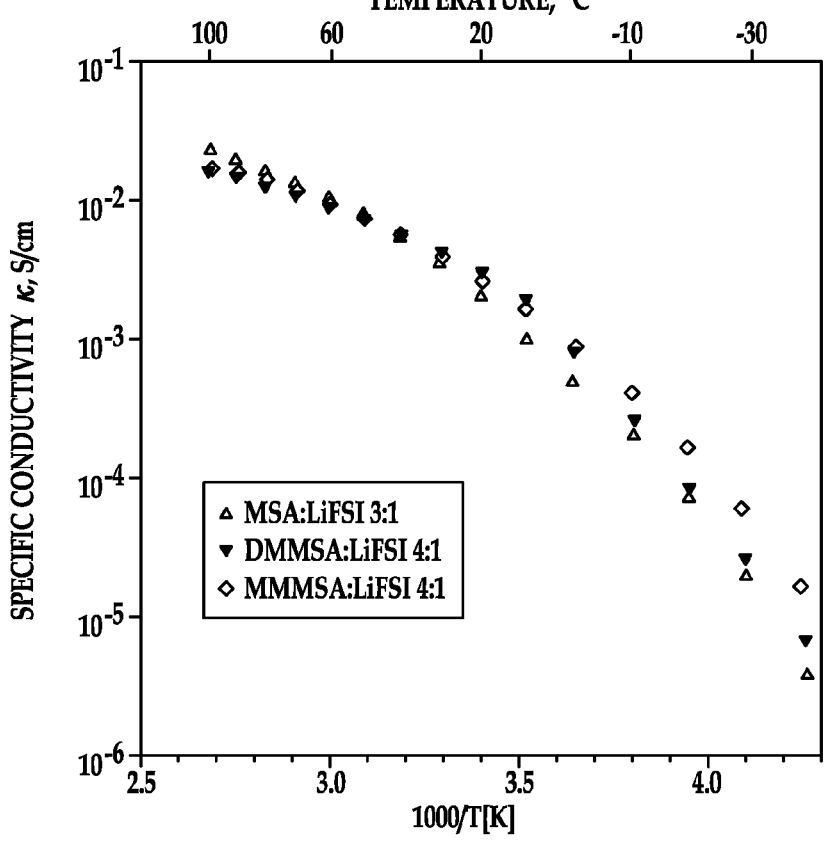
FIG. 4 is a graph depicting the temperature dependence of the specific conductivity for bis(fluorosulfonyl)imide anion-based eutectic lithium electrolytes as disclosed herein.

FIG. 4 is a graph depicting the temperature dependence of the specific conductivity (κ) for eutectic mixtures of a 1:3 ratio of lithium bis(fluorosulfonyl)imide (LiFSI) and methanesulfonamide (MSA), a 1:4 ratio of lithium bis(fluorosulfonyl)imide and N,N-dimethylmethanesulfonamide (DMMSA), and a 1:4 ratio of lithium bis(fluorosulfonyl)imide and N-methylmethanesulfonamide (MMMSA). As shown in the graph, the specific conductivity for these eutectic mixtures is about the same at room temperature (from about 20° C. (68° F.) to about 25° C. (77° F.)), which is about $3.5 \times 10^{-3}$ S/cm. The graph also shows that all three of the mixtures have substantially the same specific conductivity as the temperature increases from room temperature to about +60° C. At temperature higher than +60° C., the specific conductivity for the 3:1 MSA/LiFSI mixture is slightly higher than that of the other mixtures shown. At temperatures significantly lower than room temperature (e.g., at about 0° C. and less), however, the graph shows that the 4:1 MMMSA/LiFSI mixture has a higher specific conductivity than the other mixtures shown.

Figure 5:
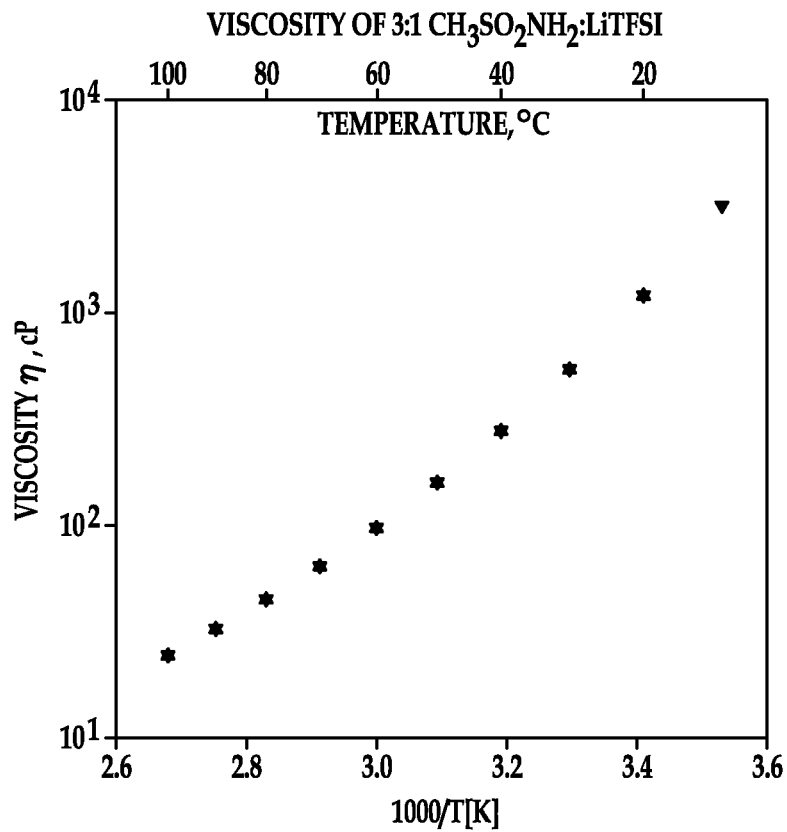
FIG. 5 is a graph depicting the temperature dependence of the viscosity for the eutectic mixture of methanesulfonamide and lithium bis(trifluoromethylsulfonyl)imide present in a 3:1 ratio.

The temperature dependence of the viscosity of a methanesulfonamide/LiTFSI eutectic mixture having a 3:1 ratio is shown in FIG. 5. As shown in the figure, the viscosity of the eutectic mixture is relatively high, e.g., 1200 cP at 20° C., as compared to the viscosity of $LiPF_6$ dissolved in mixtures of carbonate solvents (e.g., 2 cP to 10 cP). In an embodiment, the electrolyte may further include a diluent configured to decrease the viscosity ranging from about 10 cP to about 100 cP. One example of a diluent includes an organic carbonate such as, e.g., diethyl carbonate (DEC), dimethyl carbonate (DMC), ethylmethyl carbonate (EMC), or other cyclic or linear organic carbonates often used in electrolytes of lithium ion batteries. Another example of a diluent includes a perfluoropolyether macromer having the formula X—$CF_2O$—$(CF_2CF_2O)_p$—$(CF_2O)_q$—$CF_2X$, wherein X is chosen from $CH_2OCH_3$ or $CH_2(OCH_2CH_2)_nOCH_3$, where p is about 3.78, q is about 0.94, and n is about 0.24. In a non-limiting example, the materials chosen for X have a molecular weight (MW) ranging from 500 to 1000. Some suitable perfluoropolyether macromers include the Fluorolink polymer modifiers manufactured by Solvay Solexis, Italy. These diluents generally have a glass transition temperature $T_g$ ranging from about −90° C. to about −110° C., and a viscosity ranging from about 8 to about 10 times less than that of the eutectic mixture (or ionic liquid) disclosed above. Yet another example of a diluent includes a low molecular weight (e.g., a MW ranging from about 580 to about 610) perfluoropolyether having the formula $CF_3O$—$(CF_2CF(CF_3)O)_n$—$(CF_2O)_m$—$CF_3$, where n is about 1.4 and m ranges from 3.0 to 3.5. Other diluents include lactones (such as, e.g., γ-butyrolactone and γ-valerolactone), nitriles (such as, e.g., glutaronitrile), glymes (such as, e.g., monoglyme (ethylene glycol dimethyl ether), diglyme (bis(2- methoxyethyl)ether)), aliphatic or aromatic carboxylic acid esters, ethers (such as, e.g., dioxolane, tetrahydrofuran, 1,2-dimethoxyethane, and/or the like), and combinations thereof.

Figure 6:
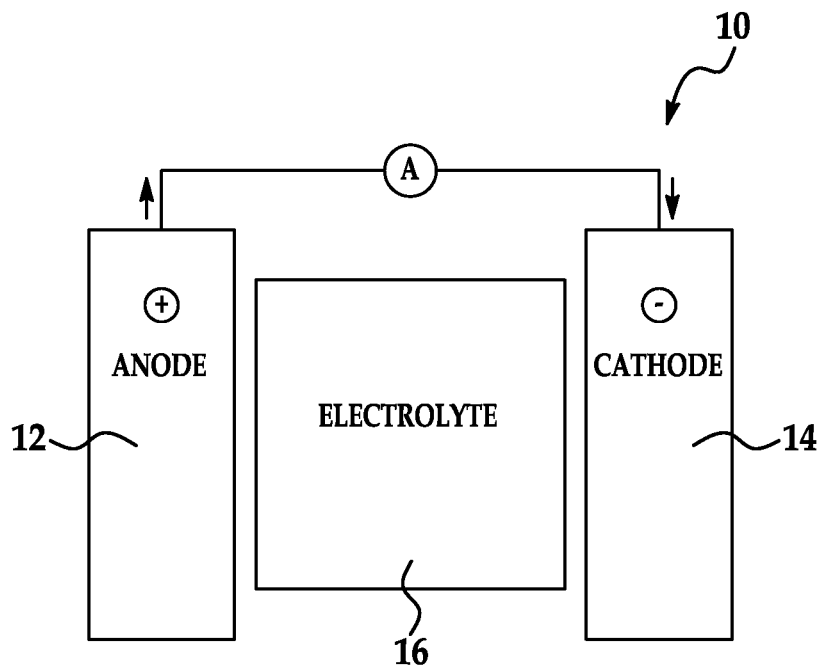
FIG. 6 schematically depicts an example of a lithium ion battery.

The embodiment(s) and/or example(s) of the electrolyte disclosed herein may be used in a lithium ion battery 10 as shown in FIG. 6. The lithium ion battery 10 is a rechargeable electrolytic cell, and the battery 10 generally includes an anode 12, a cathode 14, and the electrolyte 16 operatively disposed between the anode 12 and the cathode 14. The battery 10 may be discharged by moving lithium ions (i.e., the electrolyte) from the anode 12 to the cathode 14, and then recharged by moving the lithium ions from the cathode 14 back to the anode 12.

While several embodiments have been described in detail, it will be apparent to those skilled in the art that the disclosed embodiments may be modified. Therefore, the foregoing description is to be considered non-limiting.

The invention claimed is:

1. An ionic liquid for an electrolyte of a lithium ion battery, comprising a binary vitreous eutectic mixture represented by the formula $A_xB_y$, wherein:

A is a salt chosen from a lithium fluoroalkylsulfonimide or a lithium fluoroarylsulfonimide, wherein the lithium fluoroalkylsulfonimide and the lithium fluoroarylsulfonimide are individually represented by the formula:

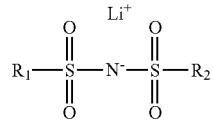

wherein $R_1$ is chosen from F, $CF_3$, $C_2F_5$, $C_4F_9$, an aromatic group, or a fluorinated aromatic group and wherein $R_2$ is chosen from F, $C_4F_9$, an aromatic group, or a fluorinated aromatic group;

B is a solvent chosen from an alkylsulfonamide or an arylsulfonamide;

x and y are the mole fractions of A and B, respectively;

a molar ratio of A to B ranges from 1:0.2 to 1:10; and the eutectic mixture is a liquid at ambient temperature and has a glass transition temperature of less than −50° C.

2. The ionic liquid as defined in claim 1 wherein the alkylsulfonamide and the arylsulfonamide are individually represented by the formula:

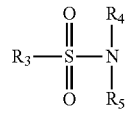

wherein: $R_3$ is chosen from $CH_3$, $C_2H_5$, $C_4H_9$, aryl, fluorinated aryl, $(CH_2)_nCF_3$ wherein n is 1 to 5, or $(CH_2)_nOR_6$ wherein n is 1 or 2 and $R_6$ is $CH_3$ or $CF_3$, and $R_4$ and $R_5$ are chosen from H, $CH_3$, or $C_4H_9$.

3. The ionic liquid as defined in claim 1 wherein A is chosen from lithium bis(fluorosulfonyl)imide, or lithium [(trifluoromethylsulfonyl)(phenylsulfony]imide.

4. The ionic liquid as defined in claim 1 wherein B is chosen from methanesulfonamide, N,N-dimethylmethanesulfonamide, N-methylmethanesulfonamide, ethanesulfonamide, n-butylsulfonamide, alkylethersulfonamide, benzenesulfonamide, or fluorinated benzenesulfonamide.

5. The ionic liquid as defined in claim 1 wherein a molar ratio of A to B ranges from 1:1 to 1:4.

6. The ionic liquid as defined in claim 1 wherein the eutectic mixture has a specific conductivity ranging from about $10^{-2}$ S/cm to about $1\times10^{-4}$ S/cm over a temperature range from about +25° C. to about −30° C.

7. The ionic liquid as defined in claim 1 wherein the electrolyte is non-flammable.

8. A lithium ion battery, comprising:
a cathode;
an anode; and
an electrolyte operatively disposed between the cathode and the anode, the electrolyte consisting of a binary eutectic mixture represented by the formula $A_xB_y$, wherein:

A is a salt chosen from a lithium fluoroalkylsulfonimide or a lithium fluoroarylsulfonimide, wherein the lithium fluoroalkylsulfonimide and the lithium fluoroarylsulfonimide are individually represented by the formula:

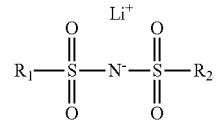

wherein $R_1$ is chosen from F, $CF_3$, $C_2F_5$, $C_4F_9$, an aromatic group, or a fluorinated aromatic group and wherein $R_2$ is chosen from F, $CF_3$, $C_2F_5$, $C_4F_9$, an aromatic group, or a fluorinated aromatic group;

B is a solvent chosen from an alkylsulfonamide or an arylsulfonamide; and x and y are the mole fractions of A and B, respectively.

9. The battery as defined in claim 8 wherein the alkylsulfonamide and the arylsulfonamide are individually represented by the formula:

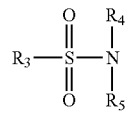

wherein: $R_3$ is chosen from $CH_3$, $C_2H_5$, $C_4H_9$, aryl, fluorinated aryl, $(CH_2)_nCF_3$ wherein n is 1 to 5, or $(CH_2)_nOR_6$ wherein n is 1 or 2 and $R_6$ is $CH_3$ or $CF_3$, and $R_4$ and $R_5$ are chosen from H, $CH_3$, or $C_4H_9$.

10. The battery as defined in claim 8 wherein A is chosen from lithium bis(fluorosulfonyl)imide, or lithium [(trifluoromethylsulfonyl)(phenylsulfonyl)]imide.

11. The battery as defined in claim 8 wherein B is chosen from methanesulfonamide, N,N-dimethylmethanesulfonamide, N-methylmethanesulfonamide, ethanesulfonamide, n-butylsulfonamide, alkylethersulfonamide, benzenesulfonamide, or fluorinated benzenesulfonamide.

12. An electrolyte for a lithium ion battery, consisting of a binary vitreous eutectic mixture represented by the formula $A_xB_y$, wherein:

A is a salt chosen from a lithium fluoroalkylsulfonimide or a lithium fluoroarylsulfonimide;

B is a solvent chosen from an alkylsulfonamide or an arylsulfonamide;

x and y are the mole fractions of A and B, respectively; and a molar ratio of A to B ranges from 1:0.2 to 1:10.

13. The electrolyte as defined in claim 12 wherein:
the lithium fluoroalkylsulfonimide and the lithium fluoroarylsulfonimide are individually represented by the formula:

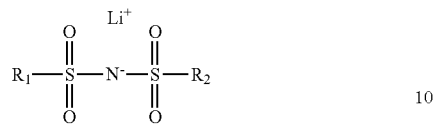

and $R_1$ and $R_2$ are individually chosen from F, $CF_3$, $C_2F_5$, $C_4F_9$, an aromatic group, or a fluorinated aromatic group; and
the alkylsulfonamide and the arylsulfonamide are individually represented by the formula:

and $R_3$ is chosen from $CH_3$, $C_2H_5$, $C_4H_9$, aryl, fluorinated aryl, $(CH_2)_n CF_3$ wherein n is 1 to 5, or $(CH_2)_n OR_6$ wherein n is 1 or 2 and $R_6$ is $CH_3$ or $CF_3$, and $R_4$ and $R_5$ are chosen from H, $CH_3$, or $C_4H_9$.

14. The electrolyte as defined in claim 12 wherein a molar ratio of A to B ranges from 1:1 to 1:4.

* * * * *